(12) United States Patent
Chang et al.

(10) Patent No.: US 7,450,588 B2
(45) Date of Patent: Nov. 11, 2008

(54) STORAGE NETWORK OUT OF ORDER PACKET REORDERING MECHANISM

(75) Inventors: Nai-Chih Chang, Shrewsbury, MA (US); Pak-lung Seto, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 135 days.

(21) Appl. No.: 11/510,109

(22) Filed: Aug. 24, 2006

(65) Prior Publication Data

US 2008/0126608 A1    May 29, 2008

(51) Int. Cl.
*H04L 12/28* (2006.01)
*H04L 12/56* (2006.01)
*G06F 3/00* (2006.01)

(52) U.S. Cl. .................. 370/394; 370/351; 370/389; 710/1; 710/5

(58) Field of Classification Search ............ 710/1, 710/5
See application file for complete search history.

(56) References Cited

U.S. PATENT DOCUMENTS

| 6,026,461 | A  | * | 2/2000  | Baxter et al.     | 710/244 |
| 6,487,212 | B1 | * | 11/2002 | Erimli et al.     | 370/413 |
| 7,349,398 | B1 | * | 3/2008  | Favor et al.      | 370/394 |
| 7,349,399 | B1 | * | 3/2008  | Chen et al.       | 370/394 |
| 2004/0022262 | A1 | * | 2/2004 | Vinnakota et al. | 370/429 |
| 2005/0025152 | A1 | * | 2/2005 | Georgiou et al.  | 370/394 |

* cited by examiner

*Primary Examiner*—Alford W. Kindred
*Assistant Examiner*—Richard Franklin
(74) *Attorney, Agent, or Firm*—Christopher K. Gagne (57) ABSTRACT

According to one embodiment, a system is disclosed. The system includes an input/output (IO) frame manager (IOFM) to route received IO frames to one or more IO lists and one or more IO frame order managers (IOFOMs) to reorder frames received for each IO list according to a relative order.

18 Claims, 7 Drawing Sheets

STORAGE NETWORK OUT OF ORDER PACKET REORDERING MECHANISM

FIELD

This disclosure relates to computer systems; more particularly, this disclosure relates to computer system interaction with hard disk drives.

BACKGROUND

In packetized storage protocols, multiple outstanding data frames are generated for a particular input/output (IO) command. Moreover, there are specific requirements and/or restrictions requiring the data frames to be transmitted in order. However, transmitting frames in their relative offset order limits IO performance. For example, ordering frames prior to transmission takes a significant amount of time in overall IO processing. Particularly, it requires a lot of time in seeking if the data of the same IO are scattered across the storage drive medium platter (due to bad blocks for instance) and the head has to move back and forth to read/retrieve those data in their relative offset order.

Transmitting data based on data availabilities has become more desirable to improve IO performance. In some configurations, such as serial Advanced Technology Attachment (ATA) (SATA) native command queuing (NCQ) protocol, a transmitting device may be allowed to transmit data Frame Information Structure (FIS) out of order. Nevertheless, transmitting frames out of order would require the receiving device to reorder the frames.

BRIEF DESCRIPTION OF THE DRAWINGS

Embodiments of the invention are illustrated by way of example and not limitation in the figures of the accompanying drawings, in which like references indicate similar elements, and in which.

DETAILED DESCRIPTION

A mechanism for reordering data frames received out of order is described. In the following detailed description numerous specific details are set forth in order to provide a thorough understanding. However, it will be apparent to one skilled in the art that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
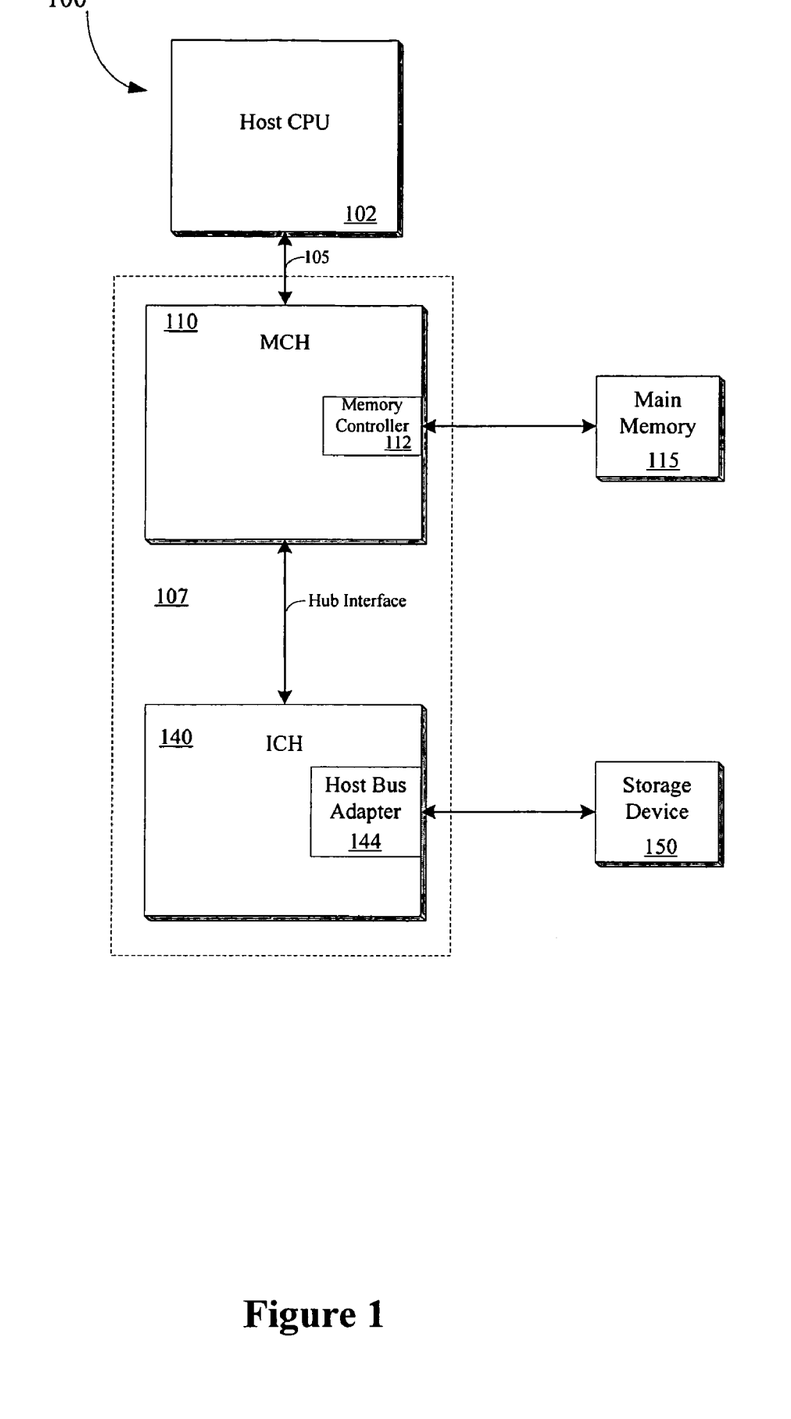
FIG. 1 is a block diagram of one embodiment of a computer system.

FIG. 1 is a block diagram of one embodiment of a computer system 100. Computer system 100 includes a central processing unit (CPU) 102 coupled to an interface 105. In one embodiment, CPU 102 is a processor in the Pentium® family of processors Pentium® IV processors available from Intel Corporation of Santa Clara, Calif. Alternatively, other CPUs may be used. For instance, CPU 102 may be implemented using multiple processing cores. In other embodiments, computer system 100 may include multiple CPUs 102

In a further embodiment, a chipset 107 is also coupled to interface 105. Chipset 107 includes a memory control hub (MCH) 110. MCH 110 may include a memory controller 112 that is coupled to a main system memory 115. Main system memory 115 stores data and sequences of instructions that are executed by CPU 102 or any other device included in system 100. In one embodiment, main system memory 115 includes dynamic random access memory (DRAM); however, main system memory 115 may be implemented using other memory types. Additional devices may also be coupled to interface 105, such as multiple CPUs and/or multiple system memories.

MCH 110 is coupled to an input/output control hub (ICH) 140 via a hub interface. ICH 140 provides an interface to input/output (I/O) devices within computer system 100. ICH 140 may support standard I/O operations on I/O busses such as peripheral component interconnect (PCI), accelerated graphics port (AGP), universal serial bus (USB), low pin count (LPC) bus, or any other kind of I/O bus (not shown).

According to one embodiment, ICH 140 includes a host bus adapter (HBA) 144. HBA 144 serves as a controller implemented to control access to one or more hard disk drives 150. In such an embodiment, HBA 144 operates as an SAS device coupled to one or more additional SAS devices. In a further embodiment, storage device 150 is a SAS-SSP drive. However in other embodiments, storage devices 150 may be implemented as other drives with serial interface protocols.

According to one embodiment, HBA 144 transmits and receives data frames. For a particular IO, multiple outstanding frames may be generated. In the case of outbound IO transmissions (e.g., IO write data phase), the transmitter component of HBA 144 has total control of transmitting transmit (TX) frames in the order based on relative offset.

For instance, an 8 Kilobyte (KB) IO write with starting address 0 is segmented to eight 1 KB frames. The transmitter may transmit the first frame with relative offset (RO) 0. After it has transmitted the first frame, the transmitter then transmits the second frame with starting address (SA) 1K. The transmitter then repeats the same process with increment order of RO until all 8 frames are sent. In SAS-SSP wide port, where multiple lanes are implemented, the transmitter may choose to hop to another lane to continue transmitting a frame of the same IO when the original lane becomes ACK/NAK balanced (e.g., the number of received ACK/NAK primitives is the same as the number of transmitted frames). Further, the transmitter may still transmit those frames in order as described above.

According to one embodiment, the HBA 144 transmitter includes hardware to transmit outbound IO data frames out of order. Such an embodiment may include data caching, which enables available data to be transmitted prior to unavailable data even if the available data relative offset (RO) is greater than the unavailable data RO.

Figure 2:
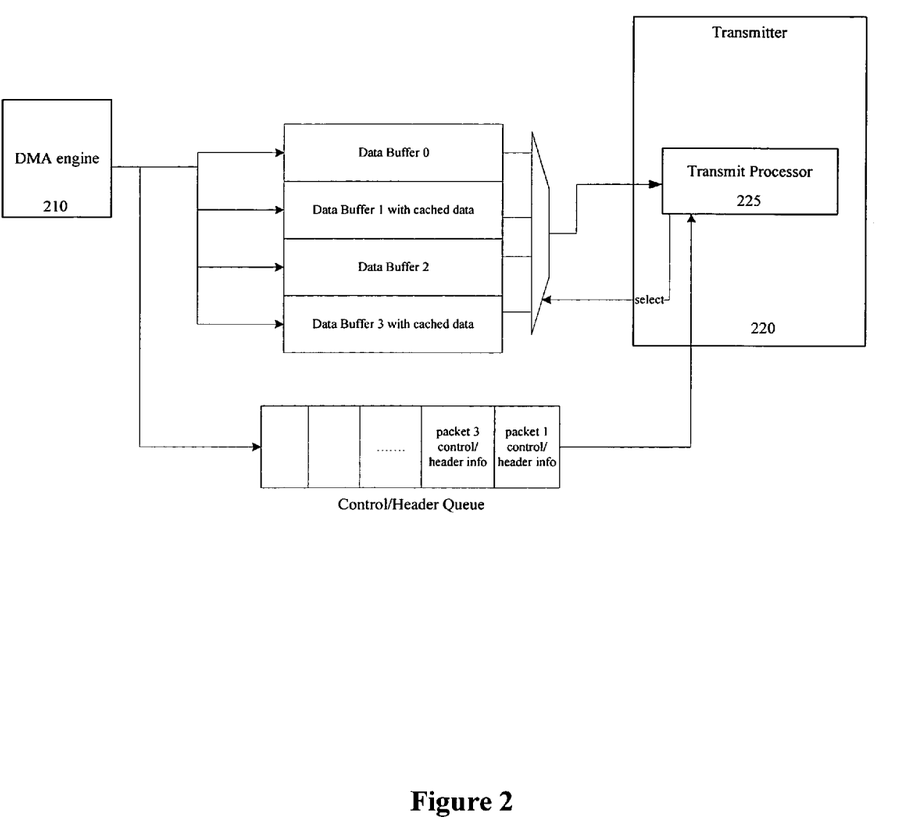
FIG. 2 illustrates one embodiment of a host bus adapter.

FIG. 2 illustrates one embodiment of a transmit component of HBA 144 where data is transmitted on availability. HBA 144 includes a direct memory access (DMA) engine 210 and a transmitter 220 having a transmit processor 225. Coupled between DMA engine 210 and transmitter 220 are data buffers 0 to 3 and a Control and Header queue.

In the flow illustrated in FIG. 2, DMA engine 210 is transferring data of the same IO to data buffer 0 and data buffer 2. The control and header information is forwarded to transmit processor 225 through the Control and Header Queue. Transmit processor 220 pops the control and header information and processes it.

Subsequently, transmit processor 220 transmits the data out of data buffer 1 to a packetized protocol interface (not shown). Note that data 1 is transmitted even if data 0 is not yet ready to be transmitted. Similar data from data buffer 3 is transmitted even if data buffer 2 is not ready to be transmitted. Note that in the embodiment illustrated in FIG. 2, all four data buffers are reserved and used for the same IO. Also note that, transmit processor 225 transmits data based on data availability.

In the case of inbound data transfers, such as IO read data, the receiver component of HBA 144 does not have control of frame order reception. For the example of an 8 KB IO read in SAS-SSP wide port configuration, there may be 8 frames associated with the 8KB IO. For explanation purpose, those 8 frames may be labeled as frame 1, frame 2, frame 3, . . . and, frame 8 where frame 1 has the original starting address (SA), frame 2 has address of the original SA plus 1 KB, frame 3 has 1K incremented address of the address of frame 2, etc.

The first two 1 K frames (frame 1 and frame 2) may be received in the first lane of a SAS-SSP wide port. After the ACK/NAK became balanced on the first lane, the second two frames (frame 3 and frame 4) may be received in the second lane, and so on. Internally, the receive (RX) transport layer in the receiver may process frame 3 and frame 4 prior to processing frame 1 and frame 2 due to possibly lane stalling or blocking on the first lane. If frame 3 and frame 4 are processed prior to frame 1 and frame 2, then likely the RX transport layer may report relative offset mismatch since the RX transport layer is expecting processing relative offset (address) of frame 1 and will result in error recovery process.

In one embodiment, HBA 144 also includes hardware to reorder frames received out of order from another device. In such an embodiment, frames are reordered based on their relative offset in an out-of-order frame reception and processing environment via a link list.

Figure 3:
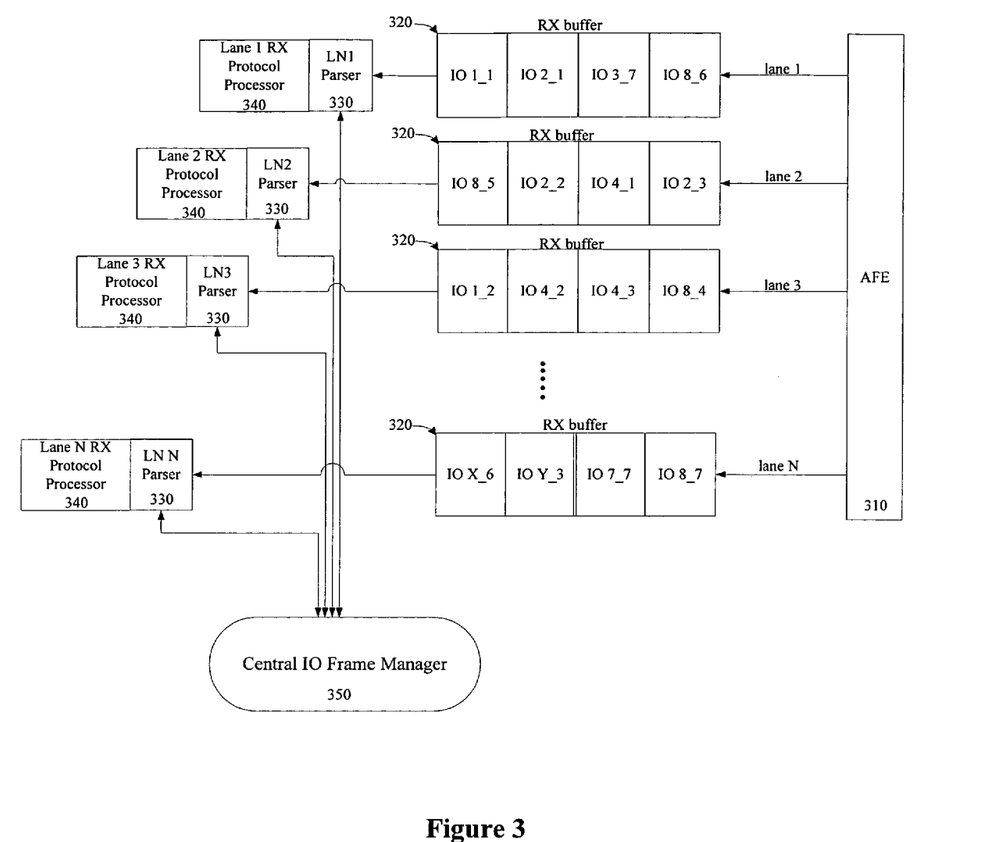
FIG. 3 illustrates another embodiment of a host bus adapter.

FIG. 3 illustrates one embodiment of a receive component of HBA 144. HBA 144 includes an analog front end (AFE) 310, RX buffers 320, lane parsers 330 and RX processors 340. According to one embodiment, a RX buffer 320, lane parser 330 and RX processor 340 is associated with each of an N number of lanes. Buffers 320 store frames received from AFE 310.

As shown in FIG. 3, each frame in a buffer includes an IO ID and a sequence number for the respective IO. For example, the first frame in the RX buffer 320 associated with lane 1 is IO1_1, which indicates the frame is the first frame of IO1. Parsers 330 parses the received frames and forwards the frames to obtain information including request, client ID, event ID and absolute timeout value. The information is forwarded to and forwards an associated processor 340 for processing.

Figure 4:
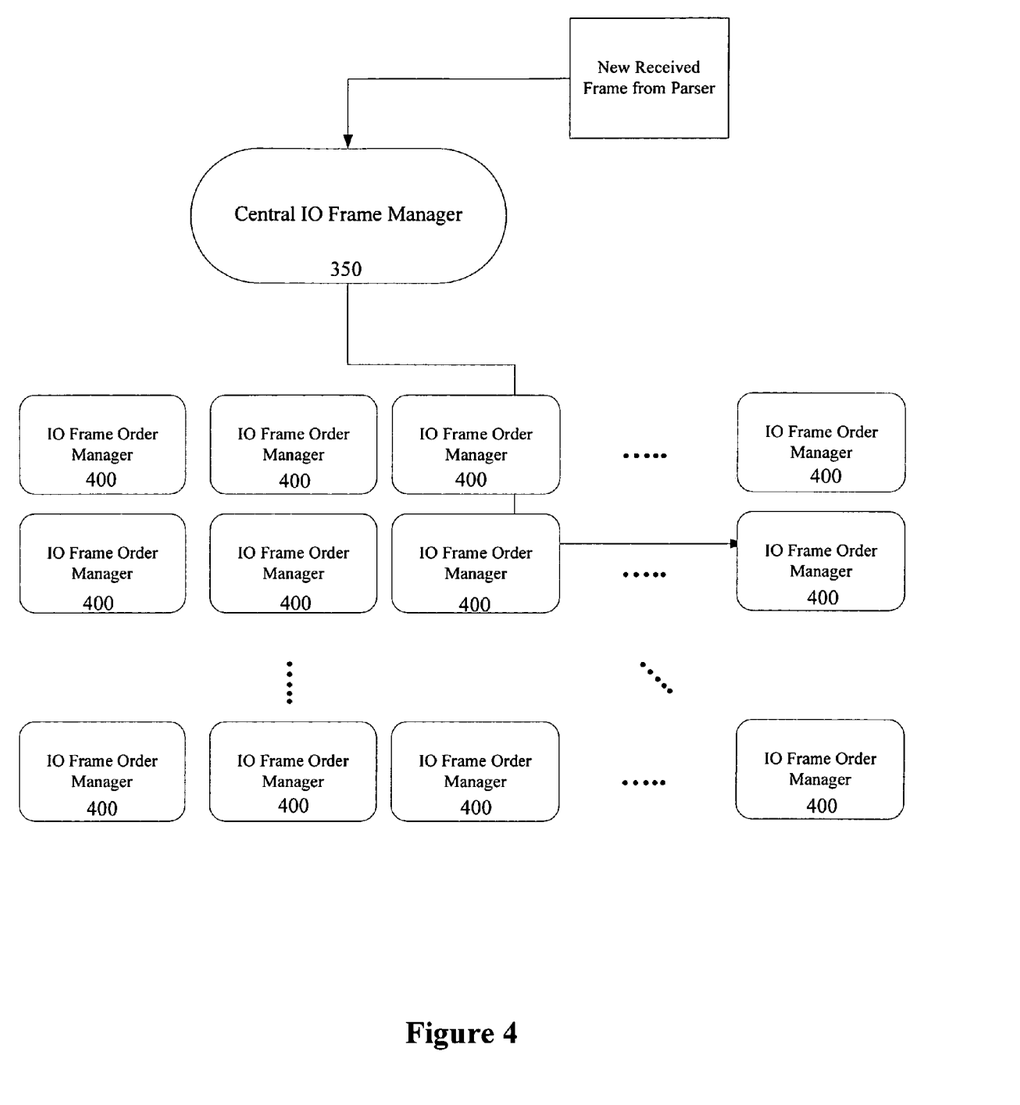
FIG. 4 illustrates one embodiment of a central IO frame manager.

HBA 144 also includes a central IO frame manager 350 coupled to each parser 330. Central IO frame manager 350 routes each frame to a respective IO list based upon the IO ID of the frame. For instance, all frames with I01 are forwarded to the same group. FIG. 4 illustrates another embodiment of the receive component of HBA 144 with central IO frame manager 350 coupled to IO frame order managers 400. Each frame order manager 400 is associated with an IO, and includes a link list of the relative offset of the received frames of the same IO.

Figure 5:
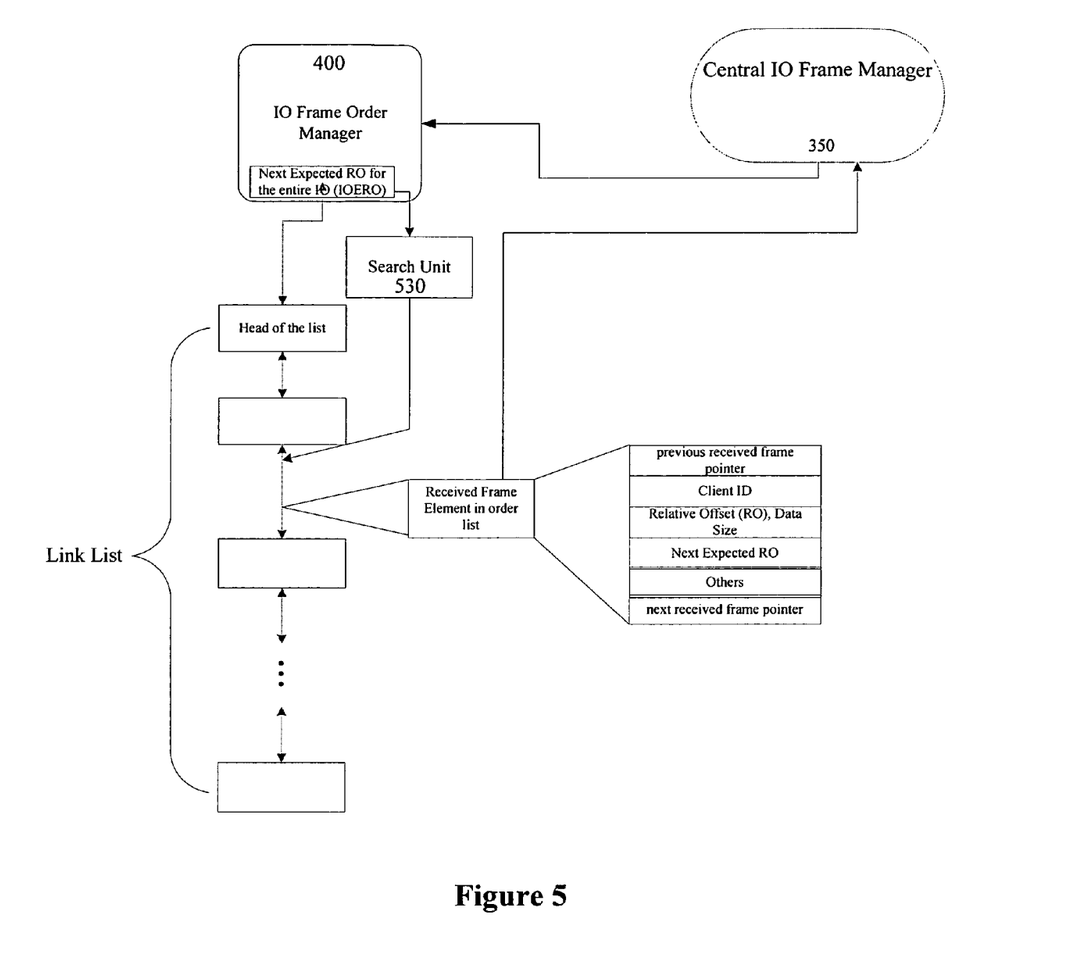
FIG. 5 illustrates one embodiment of a IO frame order manager.

FIG. 5 illustrates one embodiment of an IO frame order manager 400. IO frame order manager 400 includes one or more linked lists of frames and one or more search units 530 which search the link list based upon Relative Offset (RO). As shown in FIG. 5, each frame includes a previous received frame pointer, Client ID, Relative Offset (RO), Data Size, Next Element's Expected RO (NEERO), and next received frame pointer.

Figure 6:
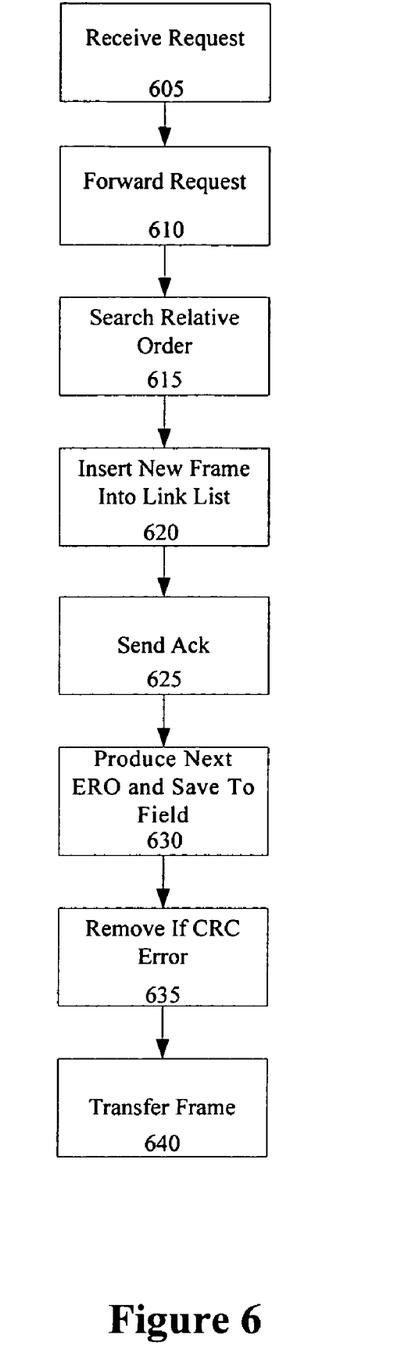
FIG. 6 is a flow diagram illustrating one embodiment of a process for reordering out of order frames.

FIG. 6 is a flow diagram illustrating one embodiment of a process implemented by central IO frame manager 350 and IO frame order managers 400 for reordering out of order frames. At processing block 605, a client (e.g., parser 330) makes a request to central IO Frame Manager 350 with proper information such as IO ID, local buffer ID, Relative Offset, data size, etc. In other embodiments, the client may be either the transport layer or the link layer. Note that, the data transfer size may be validated at the end of CRC cycle.

At processing block 610, central IO Frame Manager 350 uses IO ID to find the proper IO Frame Order Manager 400 and forwards the request to the appropriate IO Frame Order Manager 400. At processing block 615, search unit 530 uses the relative offset to search in the link list to find out the relative order of the frame within the list. In one embodiment, the new RO is compared against the next element's expected RO (NEERO) field in the elements of the linked list. The NEERO is the received frame RO plus data size.

Once search unit 350 finds where to insert the frame, it inserts the new received frame element into the link list, processing block 620. At processing block 625, an acknowledgement is sent back to the requester (or the client) to indicate completeness along with an ID. At processing block 630, the relative offset and data size (upon available) is added to produce the next element's expected relative offset (NEERO) which is saved to the field.

Subsequently, the received frame is checked for CRC. If the frame has CRC error at the end, the client (or the requester) uses the ID to remove the inserted frame in the associated offset list for that particular IO, processing block 635. In some embodiments, the total data transfer size is validated in this step so that the client can update the data size field and ERO field via the ID.

In a further embodiment, IO frame order manager 400 may only grant request to a single request in the case of validating data size after CRC cycle, and withhold the other requests to the same IO to avoid resource conflicts. When the relative offset value of the "head" of the link list meets the expected relative offset of this particular IO, the DMA engine is informed to transfer this frame out of the local buffer to achieve the frame ordering of the same IO, processing block 640.

In another embodiment, a timeout mechanism may be included to avoid the potential issue of resource lock up due to missing frames for the IO. When the list of an IO is not empty and the RO value on the head of the linked list does not match the expected value, an associated timeout counter is started. Before the timer expires, if an incoming frame inserted to the list has a match of IO expected relative offset (IOERO), the timer should be stopped. Otherwise, if the timer expires, the hardware needs to go into an error recovery routine or a retry routine to either retry the whole IO or find out why there is a missing frame.

Figure 7:
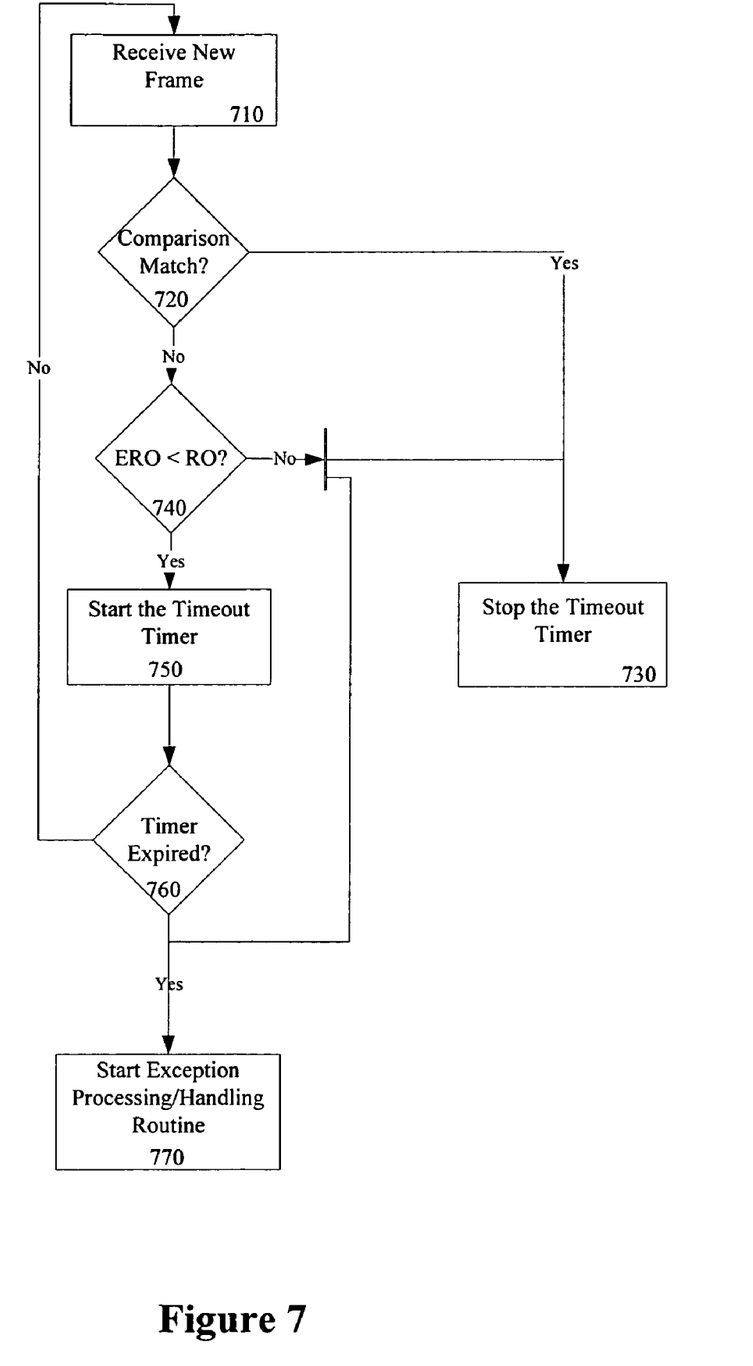
FIG. 7 is a flow diagram illustrating another embodiment of a process for reordering out of order frames.

FIG. 7 illustrates one embodiment of the above-described process with timeout mechanism. At processing block 710, the new frame is received. At decision block 720, it is determined whether there is a comparison match of the RO of the received frame and the IOERO. If a match occurs, the timer is stopped if it has previously been running, processing block 730. If there is no match, it is determined whether IOERO is less than RO.

IF IOERO is not less than RO of the received frame, an error has occurred and the control is returned to processing block 730 where the timer is again stopped, and forwarded to processing block 770 where the hardware enters into an error recovery routine or a retry routine to either retry the whole IO or find out why there is a missing frame. IF IOERO is less than the RO of the received frame, the timer is started in processing block 750.

In one embodiment, the start timer process 750 will reset the timer if the timer is not running and start the timer. In a further embodiment, the start process has no effect on the timer if the timer had previously been running. In yet a further embodiment, the stop timer command has a higher priority than the start timer command.

At processing block 760, it is determined whether the timer has expired. If expired, the hardware enters into the error recovery routine or the retry routine, processing block 770. If the timer has not expired, control is returned to processing block 710 where a new frame is received.

Note that the above-described embodiment is to check the out-of-order frame window timeout at the head of the link list of the IO. However, another embodiment may be implemented, which monitors the gap of ERO between two elements of the same link list. Once the first gap of two elements is found, the timeout timer is started and procedures similar to those described with respect to FIG. 7 are performed.

Although described as implementing hardware, other embodiments may be implemented using firmware and/or software without departing from the true scope of the invention. Thus, some portions of the detailed descriptions described above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The instructions of the programming language(s) may be executed by one or more processing devices (e.g., processors, controllers, control processing units (CPUs)).

The above-described mechanism provides an enhanced automated solution of In-Order Packet Processing in both SAN and NAS Open Fabric Environments. The mechanism also provides hardware automated frame reordering capability for Internet SCSI (iSCSI) protocol to reduce the burden of the requirement of frame order processing. For example, the current TCP/IP application relies on an expensive TCP Offload Engine (TOE) engine to reorder packets based on their relative offset.

Whereas many alterations and modifications will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims.

What is claimed is:

1. A system comprising:
an input/output (IO) frame manager (IOFM) to route received IO frames in a memory, from a client to two or more IO lists;
one or more IO frame order manager (IOFOM) to reorder frames received for each IO list according to a relative order; and
one or more search units to search in a link list based on a relative offset (RO) of a respective frame to find out the relative order of the respective frame within the link list; the system being capable to compare the RO of the respective frame to next element expected RO (NEERO) fields of elements in the link list, to add the RO of the respective frame to a data size to produce the NEERO, and to save the NEERO.

2. The system of claim 1 wherein the IOFOM further comprises:
one or more link lists corresponding to each of the one or more IO lists.

3. The system of claim 2 wherein the search unit inserts the frame into the link list upon determining the relative order.

4. The system of claim 2 wherein the IOFOM further includes a timer to keep track of time the one or more search units search the link list.

5. The system of claim 1 wherein the system further comprises:
one or more parsers, coupled to the IOFM, to parse received IO frames; and
one or more lane processors, coupled to each of the one or more parsers, to process the frames.

6. The system of claim 5 further comprising one or more receive buffers, coupled to each of the one or more parsers, each receive buffer to store frames received for the IO lists.

7. The system of claim 6 further comprising an analog front end coupled to the receive buffers to receive the frames.

8. A method comprising:
receiving a request from a client having an input/output (IO) identification (ID);
an IO frame manager (IOFM) forwarding the request to a first of a plurality of IO frame order managers (IO-FOMS) using the IO ID;
the first IOFOM searching a link list to determine a relative order of a frame included within the request in the link list; and
inserting the frame into the link list;
transmitting an acknowledgement to the client once the frame is inserted in the link list, the relative offset (RO) of the frame being used to search in the link list to find out the relative order of the frame within the list, the RO being compared to next element expected RO (NEERO) fields in elements in the link list;
adding the RO and a data size to produce the NEERO; and
saving the NEERO in the element.

9. The method of claim 8 further comprising checking the frame for CRC error.

10. The method of claim 9 further comprising removing the frame from the link list if the frame has CRC error.

11. The method of claim 8 further comprising:
determining if an IO expected RO (IOERO) is less than the RO if RO does not match IOERO; and
starting a timer if the IOERO is less than RO.

12. The method of claim 11 further comprising entering into an error recovery/retry routine if IOERO is greater than RO.

13. The method of claim 12 further comprising:
determining if the timer has expired; and
entering into the error recovery/retry routine if the timer has expired.

14. The method of claim 11 further comprising:
receiving a second request including a second frame;
determining if a RO of the second flame matches the IOERO; and
stopping the timer if the RO of the second flame matches the IOERO.

15. A system comprising:
a hard disk drive; and
a host device, communicatively coupled to the hard disk drive, having:
an input/output (IO) frame manager (IOFM) to route received IO frames to two or more IO lists; and
one or more IO frame order managers (IOFOMs) to reorder frames received for each IO list according to a relative order; and
one or more search units to search in a link list based on a relative offset (RO) of a respective frame to find out the relative order of the respective frame within the link list;
the system being capable to compare the RO of the respective frame to next element expected RO (NEERO) fields of elements in the link list, to add the RO of the respective frame to a data size to produce the NEERO, and to save the NEERO.

16. The system of claim 15 wherein the IOFOM further comprises:
one or more link lists corresponding to each of the one or more IO lists; and
a timer to keep track of time the one or more search units search the link list.

17. The system of claim 16 wherein the search unit inserts the frame into the link list upon determining the relative order.

18. The system of claim 15 wherein the system further comprises:
one or more parsers, coupled to the IOFM, to parse received IO frames;
one or more lane processors, coupled to each of the one or more parsers, to process the frames; and
one or more receive buffers, coupled to each of the one or more parsers, each receive buffer to store frames received for the IO lists.

* * * * *

UNITED STATES PATENT AND TRADEMARK OFFICE
CERTIFICATE OF CORRECTION

PATENT NO. : 7,450,588 B2 Page 1 of 1
APPLICATION NO. : 11/510109
DATED : November 11, 2008
INVENTOR(S) : Chang et al.

It is certified that error appears in the above-identified patent and that said Letters Patent is hereby corrected as shown below:

In column 7, lines 22-23, in Claim 8, delete "(IOFOMS)" and insert -- (IOFOMs) --, therefor.

Signed and Sealed this

Tenth Day of February, 2009

JOHN DOLL
*Acting Director of the United States Patent and Trademark Office*